United States Patent
Nagayama et al.

(10) Patent No.: US 7,255,963 B2
(45) Date of Patent: Aug. 14, 2007

(54) NON-AQUEOUS ELECTROLYTE RECHARGEABLE BATTERY

(75) Inventors: Masatoshi Nagayama, Hirakata (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 188 days.

(21) Appl. No.: 10/730,049

(22) Filed: Dec. 9, 2003

(65) Prior Publication Data

US 2004/0126661 A1 Jul. 1, 2004

(30) Foreign Application Priority Data

Dec. 26, 2002 (JP) ............... 2002-376664

(51) Int. Cl.
*H01M 4/50* (2006.01)
*H01M 4/00* (2006.01)
*H01M 4/58* (2006.01)

(52) U.S. Cl. ............... 429/231.95; 429/231.9; 429/231.3; 429/231.6; 429/223; 429/224; 429/231.1

(58) Field of Classification Search ......... 429/231.95, 429/231.9, 231.3, 231.6, 223, 224, 231.1
See application file for complete search history.

(56) References Cited

U.S. PATENT DOCUMENTS 6,482,550 B1 * 11/2002 Imachi et al. ............... 429/338
6,638,662 B2 * 10/2003 Kaneda et al. ............ 429/231.8
6,660,432 B2   12/2003 Paulsen et al.
6,805,996 B2   10/2004 Hosoya

FOREIGN PATENT DOCUMENTS

| EP | 1 391 950 A1 | 2/2004 |
| JP | 10-199525 | 7/1998 |
| JP | 2000-315503 | * 11/2000 |
| JP | P2000-315503 A | 11/2000 |
| JP | 2001-319652 A | 11/2001 |
| JP | 2002-110167 | 4/2002 |
| JP | 2002-319398 | * 10/2002 |
| JP | P2002-319398 A | 10/2002 |
| WO | WO 02/086993 A1 | 10/2002 |

* cited by examiner

*Primary Examiner*—Raymond Alejandro
*Assistant Examiner*—Angela J. Martin
(74) *Attorney, Agent, or Firm*—McDermott Will & Emery LLP

(57) ABSTRACT

A non-aqueous electrolyte rechargeable battery including: (a) a positive electrode capable of charging and discharging lithium; (b) a negative electrode capable of charging and discharging lithium; (c) a separator or a lithium ion conductive layer interposed between the positive electrode and the negative electrode; and (d) a lithium ion conductive non-aqueous electrolyte, wherein the positive electrode contains a mixture of a first positive electrode active material and a second positive electrode active material, the first positive electrode active material includes lithium oxide containing manganese, the lithium oxide further contains aluminum and/or magnesium, and the second positive electrode active material includes $Li_xCo_{1-y-z}Mg_yAl_zO_2$ where $1 \leq x \leq 1.03$, $0.005 \leq y \leq 0.1$ and $0.001 \leq z < 0.02$.

4 Claims, 1 Drawing Sheet

NON-AQUEOUS ELECTROLYTE RECHARGEABLE BATTERY

BACKGROUND OF THE INVENTION

Non-aqueous electrolyte rechargeable batteries used as a main power source of mobile telecommunication equipment and mobile electronic devices of recent model feature high electromotive force and high energy density. Known examples of positive electrode active materials used therein are composite oxides such as lithium cobalt oxide ($LiCoO_2$) and lithium nickel oxide ($LiNiO_2$). These composite oxides have a potential of 4 V or higher with respect to metallic lithium.

Each of the composite oxides used as the positive electrode active material has advantages and drawbacks. Accordingly, an attempt has been made to use two or more composite oxides in mixture. For example, it has been proposed to use a spinel-type lithium-manganese composite oxide containing a heteroelement in mixture with a spinel-type lithium-manganese composite oxide containing a heteroelement and cobalt (see Japanese Laid-Open Patent Publication No. 2000-315503, claims 1 and 11 and page 4). This publication has also proposed to make the positive electrode active material include a third oxide having favorable electron conductivity.

Further, it has also been proposed to mix a lithium-cobalt composite oxide containing a heteroelement and a lithium-nickel composite oxide (see Japanese Laid-Open Patent Publication No. 2002-319398, claim 1 and page 3).

Among the composite oxides described above, the spinel-type lithium-manganese composite oxide and lithium-nickel composite oxide containing Mn are excellent in safety under high potential, cycle characteristics and heat resistance during overcharge.

According to Japanese Laid-Open Patent Publication No. 2000-315503, the positive electrode active material contains, as main components, both of the spinel-type lithium-manganese composite oxide whose crystal expands due to intercalation of lithium ions and the lithium-nickel composite oxide whose crystal shrinks due to intercalation of lithium ions. Therefore, due to an interaction between them, contact among active material particles with progress of cycles is maintained in stable condition, thereby inhibiting reduction in cycle characteristics.

Accordingly, there arises a problem in that the advantages of the composite oxides are averaged, making their peculiarities indistinct. That is, superiority cannot be gained over a battery using a spinel-type lithium-manganese composite oxide featuring low costs and high safety as a main active material or a battery using a lithium-nickel composite oxide aiming at high capacity as a main active material.

Further, in Japanese Laid-Open Patent Publication No. 2002-319398, the same problem arises when a lithium-cobalt composite oxide containing a heteroelement is mixed with a lithium-nickel composite oxide having high capacity, because the capacity of the lithium-cobalt composite oxide is low. In particular, if the heteroelement contained in the lithium-cobalt composite oxide is other element than magnesium, capacity reduction occurs remarkably.

Still further, there arises another problem when the spinel-type lithium-manganese composite oxide or lithium-nickel composite oxide containing Mn is used as the positive electrode active material. That is, manganese in high potential state at high temperature is apt to be resolved from the positive electrode to an electrolyte. Thus, these oxides have problems in cycle characteristics and shelf life at high temperature.

BRIEF SUMMARY OF THE INVENTION

In view of the above problems, an object of the present invention is to provide a non-aqueous electrolyte rechargeable battery excellent in all aspects of cycle characteristics, heat resistance and shelf life by making use of a first positive electrode active material comprising lithium oxide containing manganese in mixture with a second positive electrode active material preventing Mn from resolving out of the first positive electrode active material.

The present invention relates to a non-aqueous electrolyte rechargeable battery comprising: (a) a positive electrode capable of charging and discharging lithium; (b) a negative electrode capable of charging and discharging lithium; (c) a separator or a lithium ion conductive layer interposed between the positive electrode and the negative electrode; and (d) a lithium ion conductive non-aqueous electrolyte, wherein the positive electrode contains a mixture of a first positive electrode active material and a second positive electrode active material, the first positive electrode active material comprises lithium oxide containing manganese, the lithium oxide further contains aluminum and/or magnesium and the second positive electrode active material comprises $Li_xCo_{1-y-z}Mg_yAl_zO_2$ where $1 \leq x \leq 1.03$, $0.005 \leq y \leq 0.1$ and $0.001 \leq z < 0.02$.

The first positive electrode active material is preferably $Li_aNi_bMn_cCo_dM_eO_2$ where M is Al and/or Mg, $1 \leq a \leq 1.2$, $0.3 < b \leq 0.5$, $0.3 < c \leq 0.5$, $0 < d < 0.4$, $0 < e \leq 0.1$ and $b+c+d+e=1$ or $Li_aMn_bM_{2-b}O_4$ where M is Al and/or Mg, $1 \leq a \leq 1.2$ and $1.8 \leq b < 2$.

The content of the second positive electrode active material in the mixture of the first and second positive electrode active materials is preferably 10 wt % or higher.

The above-described non-aqueous electrolyte rechargeable battery preferably has an end-of-charge voltage of 4.3 to 4.4 V in a normal operation state.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
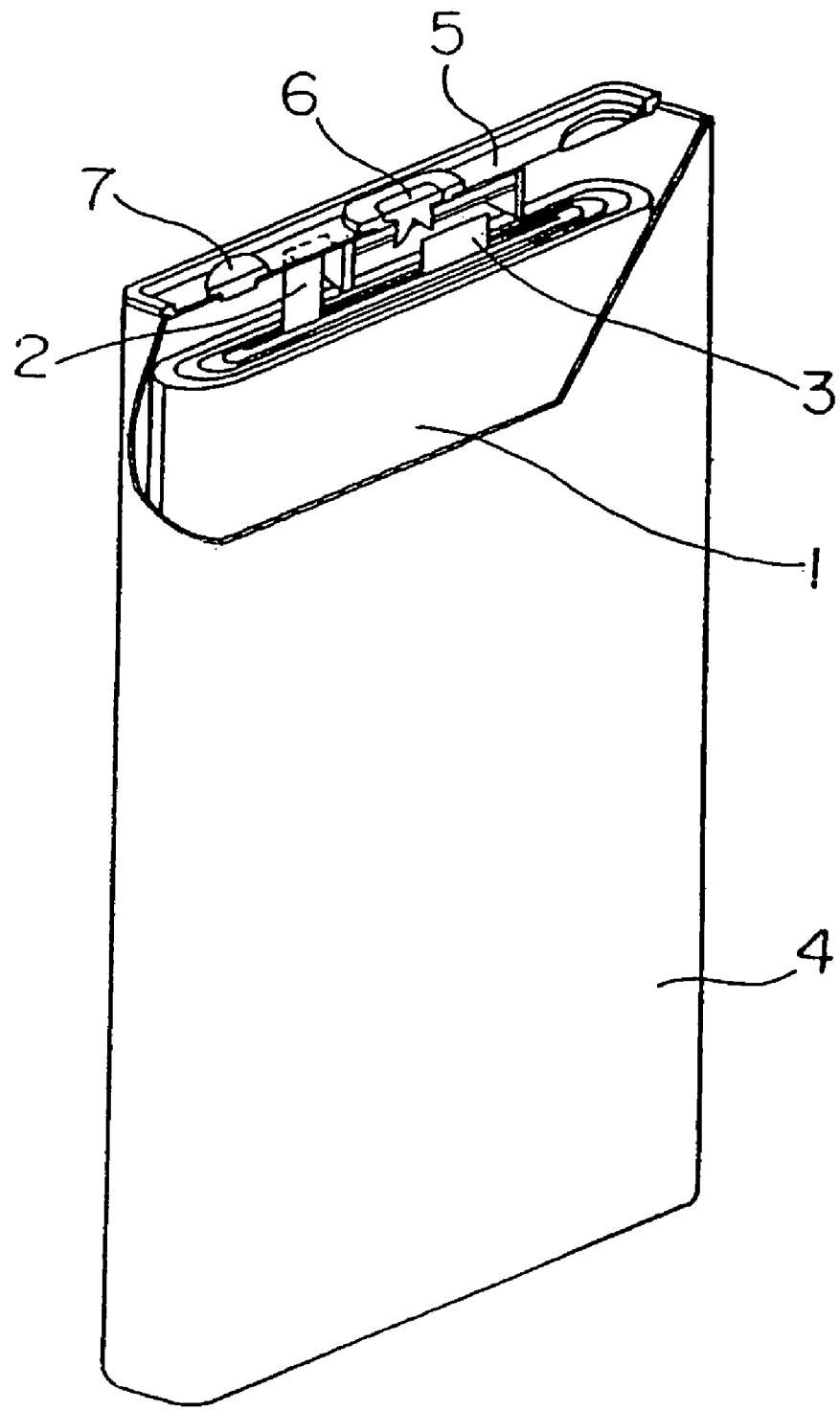
FIG. 1 is an oblique view of a prismatic non-aqueous electrolyte rechargeable battery according to Examples of the present invention, with parts broken away.

A positive electrode of the non-aqueous electrolyte rechargeable battery of the present invention contains a mixture of a first positive electrode active material and a second positive electrode active material.

The first positive electrode active material comprises lithium oxide containing manganese. The lithium oxide further contains aluminum and/or magnesium. The second positive electrode active material comprises $Li_xCo_{1-y-z}Mg_yAl_zO_2$ where $1 \leq x \leq 1.03$, $0.005 \leq y \leq 0.1$ and $0.001 \leq z < 0.02$.

Since the first positive electrode active material contains Mn, and further contains Al and/or Mg, it shows excellent heat resistance and safety in a hot plate test and an overcharge test, exhibiting favorable charge-discharge cycle characteristics. However, Mn is more apt to be resolved out of the first positive electrode active material with increase in environmental temperature or battery voltage. Therefore, to enhance the cycle characteristics and the like of the battery to a satisfactory degree, resolution of Mn needs to be inhibited.

With the deintercalation of lithium, Mn is oxidized to a valence of 4. However, even in the oxidized state, Mn is able to exist stably in nature as typified by $MnO_2$, and hence shows high safety.

The second positive electrode active material has the effect of inhibiting resolution of Mn from the first positive electrode active material. The mechanism to inhibit the manganese resolution has not been revealed yet, but it is probably caused by interaction between Mn contained in the first positive electrode active material and Co contained in the second positive electrode active material. Such interaction is considered as relying on the difference between reaction potentials of the first and second positive electrode active materials.

The effect of inhibiting the manganese resolution is enhanced by stabilizing the potential of the second positive electrode active material containing Co. Since Mg and Al contained in the second positive electrode active material have the effect of improving the electron conductivity of the second positive electrode active material, they function to stabilize the potential of the second positive electrode active material. That is, owing to its high electron conductivity, the second positive electrode active material is able to function as a conductive material in the positive electrode and give a uniform potential distribution therein. If the uniform potential distribution is obtained, it is assumed that the content of Mn in an overvoltage state is relatively reduced. As a result, the manganese resolution is inhibited.

The overvoltage state mentioned herein is not a so-called overcharge state, but a state in which an active material cannot react uniformly during charge at high load (quick charge), resulting high apparent battery voltage.

A preferable first positive electrode active material may be $Li_aNi_bMn_cCo_dM_eO_2$ where M is Al and/or Mg, $1 \leq a \leq 1.2$, $0.3 < b \leq 0.5$, $0.3 < c \leq 0.5$, $0 < d < 0.4$, $0 < e \leq 0.1$ and $b+c+d+e=1$. $Li_aNi_bMn_cCo_dM_eO_2$ advantageously has excellent characteristics against overdischarge and safety against overcharge, as well as high charge-discharge capacity.

If the value b indicating the Ni content in $Li_aNi_bMn_cCo_dM_eO_2$ is 0.3 or smaller, a high capacity active material cannot be obtained. If the value b is larger than 0.5, the active material may decrease in capacity or deteriorate in heat resistance. Further, if the value c indicating the Mn content in $Li_aNi_bMn_cCo_dM_eO_2$ is 0.3 or smaller, an active material excellent in cycle characteristics cannot be obtained. If the value c is larger than 0.5, the active material decreases in capacity. In $Li_aNi_bMn_cCo_dM_eO_2$, Co has the function of inhibiting discharge voltage from increasing. However, if the value d indicating the Co content is 0.4 or larger, the first positive electrode active material may decrease in heat resistance.

Another preferable first positive electrode active material may be $Li_aMn_bM_{2-b}O_4$ where M is Al and/or Mg, $1 \leq a \leq 1.2$ and $1.8 \leq b < 2$. $Li_aMn_bM_{2-b}O_4$ has advantages of not only low manufacture cost but also safety under high potential, showing excellent safety against increased battery operation voltage and overcharge.

In $Li_aNi_bMn_cCo_dM_eO_2$ and $Li_aMn_bM_{2-b}O_4$, an element M, i.e., Al and/or Mg, has the effect of further improving the heat resistance and cycle characteristics of the first positive electrode active material. However, if the M content is too high, capacity reduction may be caused in the first positive electrode active material. On the other hand, if other elements than Al and Mg is added as the element M, the added element may be diffused in the second positive electrode active material to cause adverse effect.

In $Li_aNi_bMn_cCo_dM_eO_2$ and $Li_aMn_bM_{2-b}O_4$, the parameter a is a value obtained immediately after the synthesis of these active materials. If the value a indicating the Li content is smaller than 1, Ni oxides and Co oxides may easily be generated as impurities during the synthesis of these active materials. If a battery is fabricated using an active material containing the impurities and subjected to charge-discharge cycles repeatedly, gas generation is apt to occur. On the other hand, if the value a exceeds 1.2, basicity of the active material increases, which may possibly cause corrosion of an electrode core.

Regarding the second positive electrode active material $Li_xCo_{1-y-z}Mg_yAl_zO_2$ where $1 \leq x \leq 1.03$, $0.005 \leq y < 0.1$ and $0.001 \leq z < 0.02$, the parameter x is a value obtained immediately after the synthesis of the active material. If the value x is smaller than 1, Co oxides may easily be produced as impurities during the synthesis of the second positive electrode active material. If a battery is fabricated using an active material containing the impurities and subjected to charge-discharge cycles repeatedly, gas generation is apt to occur. On the other hand, if the value x exceeds 1.03, basicity of the active material increases, which may possibly cause corrosion of a positive electrode core.

Magnesium has the effect of stabilizing the structure and improving the heat resistance of the second positive electrode active material. If the value y indicating the Mg content in the second positive electrode active material is smaller than 0.005, the active material structure cannot be well stabilized and the resolution of Mn from the first positive electrode active material cannot be fully inhibited. On the other hand, if the value y exceeds 0.1, the second positive electrode active material shows capacity reduction. Even if a relatively large amount of Mg is introduced in the positive electrode active material, the capacity of the second positive electrode active material is ensured and the resolution of manganese from the first positive electrode active material is inhibited as described above. This phenomenon is considered as relying on Mg's effects of enhancing the electron conductivity of the positive electrode active material and providing a uniform potential distribution in the positive electrode.

On the other hand, if other elements such as Al, copper (Cu), zinc (Zn), calcium (Ca), barium (Ba), strontium (Sr), Mn, Ni, titanium (Ti) are used alone, the inhibition of the manganese resolution cannot be achieved or the capacity may decrease significantly.

However, it is considered that Al is able to further enhance the effects of Mg of stabilizing the active material structure and heat resistance, though the mechanism thereof is not clear. The enhancement depends on the fact that the oxygen binding in the second positive electrode active material is reinforced by Al, thereby inhibiting oxygen deficiency from occurrence. If the oxygen deficiency is inhibited from occurrence, the effect of stabilizing the potential of the second positive electrode active material is enhanced, thereby improving the effect of inhibiting the Mn resolution from the first positive electrode active material. To obtain such effects, the value z needs to be 0.001 or higher. However, the Al content in the second positive electrode active material needs to be small. If the value z is 0.02 or higher, the second positive electrode active material may cause capacity reduction.

In order that the mixture of the first and second positive electrode active materials has the effect of inhibiting the manganese resolution from the first positive electrode active material, the content of the second positive electrode active material in the mixture is preferably 10 wt % or higher, more preferably, 15 wt % or higher. In view of the inhibition of the manganese resolution, the second positive electrode active material may occupy half or more of the mixture. However, with a view to making full use of the features of the first positive electrode active material so as to obtain a positive electrode with excellent cycle characteristics and heat resistance in an overcharge state, the content of the second positive electrode active material is preferably 40 wt % or lower. Further, with a view to establishing safety even in the case where the crystallinity of the first positive electrode active material is reduced to resolve out more Mn, the content of the second positive electrode active material is preferably not less than 10 wt % and not more than 30 wt %.

As to the non-aqueous electrolyte rechargeable battery of the present invention, an end-of-charge voltage in a normal operation state can be set to 4.3 to 4.4 V. The amount of resolved-out Mn depends on environmental temperature and voltage. If the battery is charged up to high voltage, the resolved-out manganese increases. Therefore, the end-of-charge voltage in the normal operation state has conventionally been determined at most 4.2 V. In the non-aqueous electrolyte rechargeable battery of the present invention, however, the resolution of Mn from the first positive electrode active material is inhibited by the second positive electrode active material. Therefore, even if the battery is charged up to an end-of-charge voltage higher than 4.2 V, e.g., 4.3 to 4.4 V, the amount of resolved-out Mn does not increase, which ensures the safety.

In the present invention, a battery can be fabricated in the same structure as a conventional battery except that a positive electrode having the above-described features is used.

Accordingly, any known material may be used as a negative electrode capable of charging and discharging lithium without particular limitation. Examples of materials capable of charging and discharging lithium include alloyed materials, carbon materials, conductive polymers, lithium-containing transition metal oxides and transition metal sulfides. Among them, carbon materials are most preferably used.

Examples of the carbon materials include, for example, pyrolytic carbons, cokes (pitch coke, needle coke, petroleum coke, etc.), graphites, vitreous carbons, sintered organic polymer compounds (phenol resins and furan resins sintered at a suitable temperature for carbonization), carbon fibers and activated carbons. Among them, graphites are particularly preferable.

There is no particular limitation to the non-aqueous electrolyte. However, it is preferable to use a non-aqueous electrolyte prepared by dissolving lithium salt in a non-aqueous solvent. The non-aqueous solvent may comprise any material known in the art. In particular, preferable is a mixture solvent of cyclic carbonates such as ethylene carbonate (EC) and propylene carbonate (PC) and noncyclic carbonates such as dimethyl carbonate (DMC), diethyl carbonate (DEC), ethyl methyl carbonate (EMC) and dipropylcarbonate (DPC). Further, there is no particular limitation to the lithium salt, but $LiPF_6$, $LiBF_4$ and the like are preferably used. Two or more kinds of lithium salt may be used in combination.

As the separator used in the present invention, may preferably be used a microporous thin film having high ion permeability, a desired mechanical strength and insulation properties. Further, the separator preferably has the function of blocking its pores at a temperature over a certain level to raise internal resistance. The diameter of pores in the separator is desirably determined such that the positive and negative electrode materials and conductive materials come off the electrodes cannot pass through, for example, 0.01 to 1 μm. The thickness of the separator is preferably 10 to 300 μm. The porosity of the separator may be determined depending on the permeability to electrons and ions, material and film pressure thereof. However, a porosity of 30 to 80% is generally preferable.

The lithium ion conductive layer may preferably comprise a polymer material which retains therein an electrolyte and is integrated with the positive or negative electrode. Any polymer material may be used as long as it is capable of retaining the electrolyte therein. In particular, a copolymer of polyvinylidene fluoride and hexafluoropropylene is preferably used.

Hereinafter, specific examples of the present invention are explained with reference to the drawing.

EXAMPLE 1

FIG. 1 is an oblique view of a prismatic non-aqueous electrolyte rechargeable battery (5.2 mm in thickness, 34 mm in width and 50 mm in height) fabricated in Examples of the present invention, with parts broken away.

(a) Fabrication of Positive Electrode $LiMn_{1.8}Al_{0.2}O_4$ as a first positive electrode active material and $LiCo_{0.94}Mg_{0.05}Al_{0.01}O_2$ as a second positive electrode active material were mixed in the weight ratio of 90:10 to obtain a positive electrode active material mixture.

To 100 parts by weight of the mixture, 3 parts by weight of acetylene black as a conductive material, 5 parts by weight of polyvinylidene fluoride as a binder and a proper amount of N-methyl-2-pyrrolidone were added and mixed by stirring to obtain a positive electrode material mixture paste. The polyvinylidene fluoride used was dissolved in advance in N-methyl-2-pyrrolidone.

Then, the positive electrode material mixture paste was applied to both surfaces of a current collector made of an aluminum foil of 20 μm thick. The coating was dried and then rolled with a roller. The obtained electrode plate was cut into a predetermined size to obtain a positive electrode.

(b) Fabrication of Negative Electrode

To 100 parts by weight of flake graphite which was pulverized and classified to have a mean particle diameter of about 20 μm, 3 parts by weight of styrene-butadiene rubber was mixed as a binder. Then, a CMC aqueous solution containing 1 part by weight of carboxymethyl cellulose (CMC) with respect to 100 parts by weight of the flake graphite was added and mixed by stirring to obtain a negative electrode material mixture paste.

Then, the negative electrode material mixture paste was applied to both surfaces of a current collector made of a copper foil of 15 μm thick. The coating was dried and then rolled with a roller. The obtained electrode plate was cut into a predetermined size to obtain a negative electrode.

(c) Fabrication of Battery

The belt-like positive and negative electrodes fabricated as described above were wound in a spiral fashion with the interposition of a microporous separator of 25 μm thick made of a polyethylene resin to form an electrode group 1. An aluminum-made positive electrode lead 2 and a nickel-made negative electrode lead 3 were welded on one end to the positive and negative electrodes, respectively. A polyethylene-made insulating ring (not shown) was attached to the electrode group such that the insulating ring comes to the top of the electrode group. Then, the electrode group was placed in an aluminum-made battery case 4. The other end of the positive electrode lead 2 was spot-welded to an inward surface of an aluminum-made sealing plate 5. The other end of the negative electrode lead 3 was spot-welded to the bottom of a nickel-made negative electrode terminal 6 provided at the center of the sealing plate 5. Then, an opening end of the battery case 4 and the periphery of the sealing plate 5 were laser-welded. A predetermined amount of a non-aqueous electrolyte was introduced through an injection hole, and then the injection hole was filled with an aluminum-made plug 7. Thus, a battery was completed.

The non-aqueous electrolyte used was a mixture solvent of ethylene carbonate and ethyl methyl carbonate in the volume ratio of 30:70 in which 1.0 mol/l of $LiPF_6$ was dissolved.

EXAMPLE 2

A battery was fabricated in the same manner as Example 1 except that a mixture of $LiMn_{1.8}Mg_{0.2}O_4$ as the first positive electrode active material and $LiCo_{0.94}Mg_{0.05}Al_{0.01}O_2$ as the second positive electrode active material in the weight ratio of 90:10 was used.

EXAMPLE 3

A battery was fabricated in the same manner as Example 1 except that a mixture of $LiNi_{0.4}Mn_{0.4}Co_{0.1}Al_{0.1}O_2$ as the first positive electrode active material and $LiCo_{0.94}Mg_{0.05}Al_{0.01}O_2$ as the second positive electrode active material in the weight ratio of 90:10 was used.

EXAMPLE 4

A battery was fabricated in the same manner as Example 1 except that a mixture of $LiNi_{0.4}Mn_{0.4}Co_{0.1}Mg_{0.1}O_2$ as the first positive electrode active material and $LiCo_{0.94}Mg_{0.05}Al_{0.01}O_2$ as the second positive electrode active material in the weight ratio of 90:10 was used.

COMPARATIVE EXAMPLE 1

A battery was fabricated in the same manner as Example 1 except that $LiMn_{1.8}Al_{0.2}O_4$ alone was used as the positive electrode active material.

COMPARATIVE EXAMPLE 2

A battery was fabricated in the same manner as Example 1 except that $LiMn_{1.8}Mg_{0.2}O_4$ alone was used as the positive electrode active material.

COMPARATIVE EXAMPLE 3

A battery was fabricated in the same manner as Example 1 except that $LiNi_{0.4}Mn_{0.4}Co_{0.1}Al_{0.1}O_2$ alone was used as the positive electrode active material.

COMPARATIVE EXAMPLE 4

A battery was fabricated in the same manner as Example 1 except that $LiNi_{0.4}Mn_{0.4}Co_{0.1}Mg_{0.1}O_2$ alone was used as the positive electrode active material.

COMPARATIVE EXAMPLE 5

A battery was fabricated in the same manner as Example 1 except that a mixture of $LiNi_{0.4}Mn_{0.4}Co_{0.1}Mg_{0.1}O_2$ as the first positive electrode active material and $LiCo_{0.95}Mg_{0.05}O_2$ as the second positive electrode active material in the weight ratio of 90:10 was used.

COMPARATIVE EXAMPLE 6

A battery was fabricated in the same manner as Example 1 except that a mixture of $LiNi_{0.4}Mn_{0.4}Co_{0.1}Mg_{0.1}O_2$ as the first positive electrode active material and $LiCo_{0.95}Al_{0.05}O_2$ as the second positive electrode active material in the weight ratio of 90:10 was used.

COMPARATIVE EXAMPLE 7

A battery was fabricated in the same manner as Example 1 except that a mixture of $LiNi_{0.4}Mn_{0.4}Co_{0.1}Mg_{0.1}O_2$ as the first positive electrode active material and $LiCo_{0.95}Mn_{0.05}O_2$ as the second positive electrode active material in the weight ratio of 90:10 was used.

COMPARATIVE EXAMPLE 8

A battery was fabricated in the same manner as Example 1 except that a mixture of $LiNi_{0.4}Mn_{0.4}Co_{0.1}Mg_{0.1}O_2$ as the first positive electrode active material and $LiCo_{0.95}Ti_{0.05}O_2$ as the second positive electrode active material in the weight ratio of 90:10 was used.

COMPARATIVE EXAMPLE 9

A battery was fabricated in the same manner as Example 1 except that a mixture of $LiNi_{0.4}Mn_{0.4}Co_{0.1}Mg_{0.1}O_2$ as the first positive electrode active material and $LiCo_{0.94}Mg_{0.05}Mn_{0.01}O_2$ as the second positive electrode active material in the weight ratio of 90:10 was used.

COMPARATIVE EXAMPLE 10

A battery was fabricated in the same manner as Example 1 except that a mixture of $LiNi_{0.4}Mn_{0.4}Co_{0.1}Mg_{0.1}O_2$ as the first positive electrode active material and $LiCo_{0.94}Mg_{0.05}Ti_{0.01}O_2$ as the second positive electrode active material in the weight ratio of 90:10 was used.

COMPARATIVE EXAMPLE 11

A battery was fabricated in the same manner as Example 1 except that a mixture of $LiNi_{0.4}Mn_{0.4}Co_{0.1}Mg_{0.1}O_2$ as the first positive electrode active material and $LiCo_{0.95}Mn_{0.025}Ti_{0.025}O_2$ as the second positive electrode active material in the weight ratio of 90:10 was used.

COMPARATIVE EXAMPLE 12

A battery was fabricated in the same manner as Example 1 except that a mixture of $LiNi_{0.4}Mn_{0.4}Co_{0.1}Mg_{0.1}O_2$ as the first positive electrode active material and $LiCo_{0.95}Al_{0.025}Mn_{0.025}O_2$ as the second positive electrode active material in the weight ratio of 90:10 was used.

COMPARATIVE EXAMPLE 13

A battery was fabricated in the same manner as Example 1 except that a mixture of $LiNi_{0.4}Mn_{0.4}Co_{0.1}Mg_{0.1}O_2$ as the first positive electrode active material and $LiCo_{0.95}Al_{0.025}Ti_{0.025}O_2$ as the second positive electrode active material in the weight ratio of 90:10 was used.

[Experimental Evaluations]

(a) Initial Capacity

Pairs of batteries fabricated in Examples 1-4 and Comparative Examples 1-13 were subjected to 10 charge-discharge cycles at environmental temperature of 20° C. The charge was carried out for 2 hours by constant voltage charge at the maximum current of 600 mA and an end-of-charge potential of 4.2 V. The discharge was carried out by constant current discharge at a current of 600 mA and an end-of-discharge potential of 3.0 V. Thereby, initial capacities of the batteries were evaluated.

After the initial capacity evaluations, ones of the battery pairs were subjected to an evaluation of cycle characteristics at high temperature and the others were subjected to an evaluation of shelf life at high temperature.

(b) Cycle Characteristics at High Temperature

At environmental temperature of 45° C., the batteries were subjected to 500 charge-discharge cycles. The charge was carried out for 2 hours by constant voltage charge at the maximum current of 600 mA and an end-of-charge potential of 4.2 V. The discharge was carried out by constant current discharge at a current of 600 mA and an end-of-discharge potential of 3.0 V. Thereby, capacity maintenance ratios of the batteries after 500 cycles was calculated with reference to the initial capacity.

(c) Shelf Life at High Temperature

The batteries in a charged state after the initial capacity evaluations at the environmental temperature of 20° C. were left stand at 60° C. for 20 days. Then, the charge and discharge were carried out again under the above-described conditions at the environmental temperature of 20° C. to measure the capacity recovery ratios of the batteries.

Table 1 shows the compositions of the positive electrode active materials in the batteries fabricated in Examples and Comparative Examples. Table 2 shows the initial capacities, capacity maintenance ratios and capacity recovery ratios obtained by the above-described experimental evaluations.

TABLE 1

| | First positive electrode active material | Second positive electrode active material | First positive electrode active material: Second positive electrode active material (weight ratio) |
|---|---|---|---|
| Ex. 1 | $LiMn_{1.8}Al_{0.2}O_4$ | $LiCo_{0.94}Mg_{0.05}Al_{0.01}O_2$ | 9:1 |
| Ex. 2 | $LiMn_{1.8}Mg_{0.2}O_4$ | $LiCo_{0.94}Mg_{0.05}Al_{0.01}O_2$ | 9:1 |
| Ex. 3 | $LiNi_{0.4}Mn_{0.4}Co_{0.1}Al_{0.1}O_2$ | $LiCo_{0.94}Mg_{0.05}Al_{0.01}O_2$ | 9:1 |
| Ex. 4 | $LiNi_{0.4}Mn_{0.4}Co_{0.1}Mg_{0.1}O_2$ | $LiCo_{0.94}Mg_{0.05}Al_{0.01}O_2$ | 9:1 |
| Com. Ex. 1 | $LiMn_{1.8}Al_{0.2}O_4$ | | — |
| Com. Ex. 2 | $LiMn_{1.8}Mg_{0.2}O_4$ | | — |
| Com. Ex. 3 | $LiNi_{0.4}Mn_{0.4}Co_{0.1}Al_{0.1}O_2$ | | — |
| Com. Ex. 4 | $LiNi_{0.4}Mn_{0.4}Co_{0.1}Mg_{0.1}O_2$ | | — |
| Com. Ex. 5 | $LiNi_{0.4}Mn_{0.4}Co_{0.1}Mg_{0.1}O_2$ | $LiCo_{0.95}Mg_{0.05}O_2$ | 9:1 |
| Com. Ex. 6 | $LiNi_{0.4}Mn_{0.4}Co_{0.1}Mg_{0.1}O_2$ | $LiCo_{0.95}Al_{0.05}O_2$ | 9:1 |
| Com. Ex. 7 | $LiNi_{0.4}Mn_{0.4}Co_{0.1}Mg_{0.1}O_2$ | $LiCo_{0.95}Mn_{0.05}O_2$ | 9:1 |
| Com. Ex. 8 | $LiNi_{0.4}Mn_{0.4}Co_{0.1}Mg_{0.1}O_2$ | $LiCo_{0.95}Ti_{0.05}O_2$ | 9:1 |
| Com. Ex. 9 | $LiNi_{0.4}Mn_{0.4}Co_{0.1}Mg_{0.1}O_2$ | $LiCo_{0.94}Mg_{0.05}Mn_{0.01}O_2$ | 9:1 |
| Com. Ex. 10 | $LiNi_{0.4}Mn_{0.4}Co_{0.1}Mg_{0.1}O_2$ | $LiCo_{0.94}Mg_{0.05}Ti_{0.01}O_2$ | 9:1 |
| Com. Ex. 11 | $LiNi_{0.4}Mn_{0.4}Co_{0.1}Mg_{0.1}O_2$ | $LiCo_{0.95}Mn_{0.025}Ti_{0.025}O_2$ | 9:1 |
| Com. Ex. 12 | $LiNi_{0.4}Mn_{0.4}Co_{0.1}Mg_{0.1}O_2$ | $LiCo_{0.95}Al_{0.025}Mn_{0.025}O_2$ | 9:1 |
| Com. Ex. 13 | $LiNi_{0.4}Mn_{0.4}Co_{0.1}Mg_{0.1}O_2$ | $LiCo_{0.95}Al_{0.025}Ti_{0.025}O_2$ | 9:1 |

TABLE 2

| | Initial capacity (mAh) | Capacity maintenance ratio (%) | Capacity recovery ratio (%) |
|---|---|---|---|
| Ex. 1 | 674 | 82 | 96 |
| Ex. 2 | 682 | 80 | 92 |
| Ex. 3 | 840 | 86 | 93 |
| Ex. 4 | 853 | 83 | 90 |

TABLE 2-continued

|  | Initial capacity (mAh) | Capacity maintenance ratio (%) | Capacity recovery ratio (%) |
|---|---|---|---|
| Com. Ex. 1 | 632 | 58 | 60 |
| Com. Ex. 2 | 658 | 54 | 60 |
| Com. Ex. 3 | 847 | 62 | 72 |
| Com. Ex. 4 | 867 | 59 | 69 |
| Com. Ex. 5 | 848 | 78 | 85 |
| Com. Ex. 6 | 828 | 76 | 84 |
| Com. Ex. 7 | 824 | 77 | 85 |
| Com. Ex. 8 | 821 | 76 | 83 |
| Com. Ex. 9 | 845 | 76 | 84 |
| Com. Ex. 10 | 842 | 77 | 85 |
| Com. Ex. 11 | 833 | 76 | 83 |
| Com. Ex. 12 | 822 | 76 | 83 |
| Com. Ex. 13 | 820 | 74 | 82 |

As seen in Table 2, the batteries of Examples showed excellent cycle characteristics and favorable shelf life at high temperature as compared with those of Comparative Examples.

Although the batteries of Examples 1 and 2 were relatively low in capacity, they are advantageous because they can be manufactured at low costs owing to the first positive electrode active material which is low in cost, high in safety and simplifies a protective circuit therefor.

Further, the batteries of Examples 3 and 4 are promising as high quality batteries for higher demands because they showed high capacity.

The batteries of Comparative Examples 5 and 6 in which the second positive electrode active materials contained Mg or Al alone were inferior in characteristics to the battery of Example 4 whose second positive electrode active material contained both of Mg and Al. Further, the batteries of Comparative Examples 7 to 13 whose second positive electrode active materials contained other elements than Mg and Al were also inferior in characteristics to the battery of Example 4. In comparison between the batteries of Example 4 and those of Comparative Examples 5 to 13 using the same first positive electrode active material, it is understood that the battery characteristics show significant change depending on the second positive electrode active material selected.

Thus, according to the present invention, full use is made of the features of the first positive electrode active material owing to the effect of the second positive electrode active material of inhibiting the Mn resolution from the first positive electrode active material containing Mn as well as Al and/or Mg. Thereby, the present invention provides a non-aqueous electrolyte rechargeable battery excellent in cycle characteristics, heat resistance and shelf life.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte rechargeable battery comprising:
    (a) a positive electrode capable of charging and discharging lithium;
    (b) a negative electrode capable of charging and discharging lithium;
    (c) a separator or a lithium ion conductive layer interposed between said positive electrode and said negative electrode; and
    (d) a lithium ion conductive non-aqueous electrolyte, wherein
    said positive electrode contains a mixture of a first positive electrode active material and a second positive electrode active material,
    said first positive electrode active material comprises lithium oxide containing manganese, said lithium oxide further contains aluminum and/or magnesium and
    said second positive electrode active material comprises $Li_xCo_{1-y-z}Mg_yAl_zO_2$ where $1 \leq x \leq 1.03$, $0.005 \leq y \leq 0.1$ and $0.001 \leq z < 0.02$,
    wherein the content of the second positive electrode active material in the mixture of the first and second positive electrode active materials is 10 wt % or higher and 40 wt % or lower.

2. The non-aqueous electrolyte rechargeable battery in accordance with claim 1, wherein said first positive electrode active material is $Li_aNi_bMn_cCo_dM_eO_2$ where M is Al and/or Mg, $1 \leq a \leq 1.2$, $0.3 < b \leq 0.5$, $0.3 < c \leq 0.5$, $0 < d < 0.4$, $0 < e \leq 0.1$ and $b+c+d+e=1$.

3. A non-aqueous electrolyte rechargeable battery comprising:
    (a) a positive electrode capable of charging and discharging lithium;
    (b) a negative electrode capable of charging and discharging lithium;
    (c) a separator or a lithium ion conductive layer interposed between said positive electrode and said negative electrode; and
    (d) a lithium ion conductive non-aqueous electrolyte, wherein
    said positive electrode contains a mixture of a first positive electrode active material and a second positive electrode active material,
    said first positive electrode active material comprises lithium oxide containing manganese, said lithium oxide further contains aluminum and/or magnesium and
    said second positive electrode active material comprises $Li_xCo_{1-y-z}Mg_yAl_zO_2$ where $1 \leq x \leq 1.03$, $0.005 \leq y \leq 0.1$ and $0.001 \leq z < 0.02$,
    wherein said first positive electrode active material is $Li_aMn_bM_{2-b}O_4$ where M is Al and/or Mg, $1 \leq a \leq 1.2$ and $1.8 \leq b \leq 2$.

4. The non-aqueous electrolyte rechargeable battery in accordance with claim 1, wherein an end-of-charge voltage in a normal operation state is set to 4.3 to 4.4 V.

* * * * *